Sept. 22, 1942 W. F. SCHILLING Re. 22,181

CHEMICAL APPARATUS

Original Filed June 12, 1939

INVENTOR.

W. F. Schilling.

BY

Ross J. Woodward ATTORNEY

Reissued Sept. 22, 1942

Re. 22,181

UNITED STATES PATENT OFFICE 22,181

CHEMICAL APPARATUS

William F. Schilling, Conshohocken, Pa., assignor to Ace Glass Incorporated, Vineland, N. J., a corporation of New Jersey Original No. 2,190,220, dated February 13, 1940, Serial No. 278,745, June 12, 1939. Application for reissue January 24, 1942, Serial No. 428,141

2 Claims. (Cl. 285—91)

This invention relates to chemical apparatus and more particularly to chemical apparatus for laboratory, semi-plant, or plant use, and consists of a plurality of elements which are selectively assembled in predetermined relation to each other to form the complete apparatus. At the present time, the elements are formed with inter-engaging portions which are tapered so that a tight wedging fit is obtained to hold the elements in operative relation to each other.

Such an arrangement of parts has been found unsatisfactory as the inter-fitting parts have ground surfaces which adhere very closely to each other to form a tight joint and, after a distilling operation has been carried out, it is often found that the interfitting parts have become so tightly stuck or frozen to each other that it is extremely hard to separate them and, very often, the elements of the apparatus will become broken while endeavoring to separate them. This sticking of the inter-fitting parts is due to their tight wedging fit and also caused by corrosion which takes place when certain chemicals are being distilled. In either case, it is necessary to turn the plug member in the socket member to effect release and removal of one member from another and, very often, one or both will be broken while endeavoring to separate them.

Various expedients have been resorted to in order to overcome the sticking of the inter-fitting parts of the companion elements, such as by coating their contacting surfaces with a lubricant or by coating them with metal, but these methods have not been found satisfactory as the lubricating substance and the metal with which the parts are coated are liable to cause undesired chemical reactions during experimental work and a certain amount of corrosion is also liable to occur.

It is, therefore, one object of the present invention to provide a chemical apparatus formed of assembled elements which are so connected with each other that they will be tightly held assembled but, at the same time, allowed to be easily separated when the apparatus is to be taken apart after use.

Another object of the invention is to provide a chemical apparatus wherein the elements forming the same are detachably held in engagement with each other by a connection of ball and socket formation, the socket or female member being an open hemispherical cup and the male member substantially spherical and readily insertable into the cup, where it is held by a clamp which holds the interfitting parts in close contacting engagement with each other to form a liquid and gas tight joint but which may be easily and quickly released to permit separation of the parts by a lifting or pulling movement of one part.

When elements forming a chemical apparatus are connected by wedging engagement with each other, they can only have the angular relation to each other permitted by the wedging fit of the tapered plug portion into the similarly tapered socket portion. This has been found objectionable, as it is often desirable to adjust the angular position of one or more elements of the apparatus and this cannot be done and still maintain the elements in tight fitting engagement with each other.

Therefore, another object of the invention is to provide a chemical apparatus consisting of a plurality of elements so connected with each other that they may be angularly adjusted with respect to each other and then firmly secured in the selected angular position relative to each other but easily released when so desired.

If companion elements of a chemical apparatus are connected by inter-fitting parts consisting of a tapered socket and a tapered plug received therein, the taper of the plug member causes the bore of this member to be reduced in diameter toward its lower end and at the base of the socket the member carrying the same is formed with an annular enlargement. The reduction of the bore formed through the tapered plug reduces the effective diameter of the entire apparatus to that of the smallest diameter of the bore of the plug and the enlargement about the base of the socket forms a pocket in which air bubbles may gather and mix with the chemical or vapors passing through the apparatus.

Therefore, another object of the invention is to provide an apparatus consisting of elements so connected with each other that reduction of the effective diameter of the bore of the inter-connected parts will be eliminated and also enlargement about the lower ends of the sockets done away with.

Another object of the invention is to provide a chemical apparatus consisting of a plurality of elements detachably held in engagement with each other by interconnected parts which are secured by clamps, certain of the clamps not only serving as clamps for holding the interfitting parts together, but also constituting part of means for supporting the apparatus in an elevated position over a heater or the like.

The invention is illustrated in the accompanying drawing, wherein.

Figure 1:
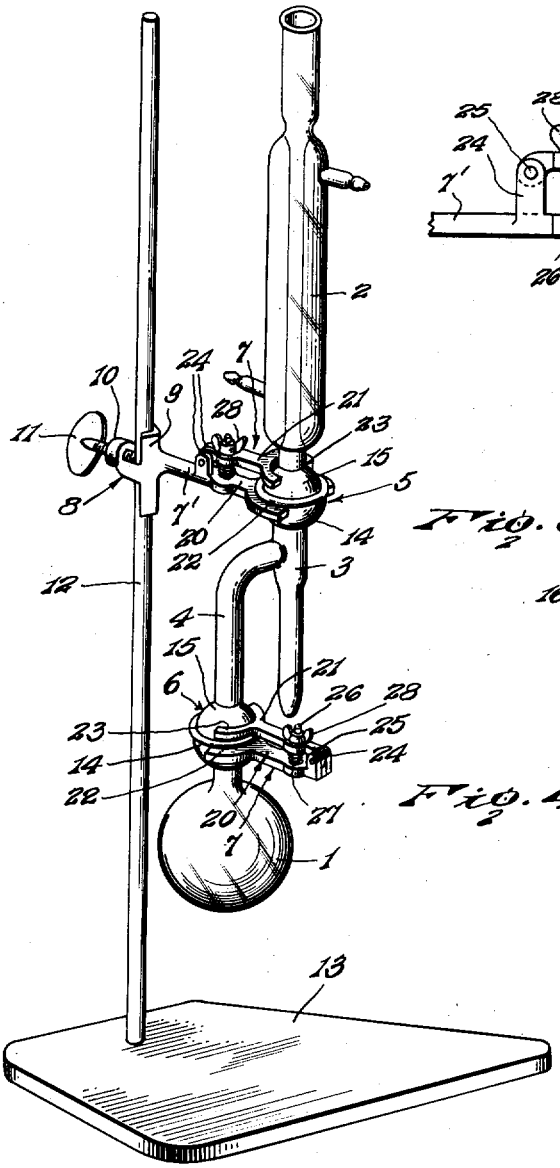
Fig. 1 is a perspective view of a chemical apparatus of the improved construction.

The chemical apparatus illustrated in Fig. 1, is a representative assembly of companion elements forming a chemical apparatus for use in laboratories and plants. This particular apparatus is a distilling apparatus and consists of a flask 1, a condenser 2 and a receiving trap 3 connected at its top with the lower end of the condenser 2 and formed with a tubular conduit 4 extending from one side and having its lower end connected with the neck of the flask 1. The connection 5 between the condenser 2 and the receiving trap 3 and the connection 6 between the flask and tube 4 of the receiving trap, are of the same construction except that the clamp 7 for the connection 5 is provided with an arm 7' extending radially therefrom and terminating in a clamp 8 having a vertically extending jaw 9 and an arm 10 though which a set screw 11 is threaded. By providing the clamp of the connection 5 with the arm 7' terminating in the clamp 8, the arm may be secured to the supporting rod or standard 12 and the apparatus mounted at a desired height above the base 13 of the stand on which is placed a conventional burner for heating contents of the flask.

As is clear from the drawing, the parts 1, 2, 3, 4 and 5 are made of glass.

It is desired to have the elements of the apparatus firmly secured to each other by a leakproof connection and, at the same time, eliminate sticking which often occurs when elements of a conventional construction are assembled to form a predetermined chemical apparatus. It is also desired to permit the connected elements to be adjusted angularly relative to each other and, in addition, provide elements of such construction that when they are assembled, the passage between them will be of an even diameter instead of being constricted by use of a tapered plug wedged into a correspondingly tapered socket.

In order to do so, the flask and the receiving trap have each been formed with a socket or female member 14 into which is fitted a male member 15 upon the companion element, it being understood that other elements used in erecting a chemical apparatus for use in chemical laboratories will be similarly formed. The socket 14 is of hemispherical formation, the inner surfaces of its walls being ground, and the male member or ball 15 is of substantially spherical formation, the upper portion of the spherical male member being of reduced diameter and set off from its lower portion by a shoulder 16, so that the lower portion 17 may be ground without marring the upper portion. An outstanding annular flange 18 having a flat under surface 19, extends about the upper marginal edge portion of the socket of the female member 14.

The clamps 7 are of duplicate construction except that the clamp for the connection 5 between the condenser and the receiving trap is provided with the mounting arm 7'. A description of one will, therefore, suffice for both, and referring to Figs. 1 and 2, it will be seen that the clamp has a lower jaw 20 which may be referred to as a stationary jaw, and an upper movable jaw 21. These jaws terminate at their front ends in forks 22 and 23 and at its rear end, the shank of the jaw 20 carries upstanding hinge ears 24 between which the rear end of the shank of the upper jaw is pivotally mounted by a pin 25. A bolt 26 is passed through openings formed in the shanks of the two jaws and about this bolt is disposed a helical spring 27 tending to shift the movable jaw 21 away from the stationary jaw 20. By tightening the winged nut 28, the movable jaw will be forced toward the stationary jaw and the two jaws held in tight gripping engagement with the socket 14 and ball 15. Pressure created by the jaws will hold the ball firmly seated in the socket and since the contacting surfaces of the ball and socket are ground, leakage will be prevented. A tight joint will thus be formed, but wedging action between the ball and socket does not take place. Therefore, the ball can be easily withdrawn from the socket when the nut is loosed to allow the spring 27 to shift the movable jaw away from the stationary jaw to a position in which the ball and socket connection may be withdrawn from the clamp. It will be understood that other specific forms of clamps may be employed.

Figure 2:
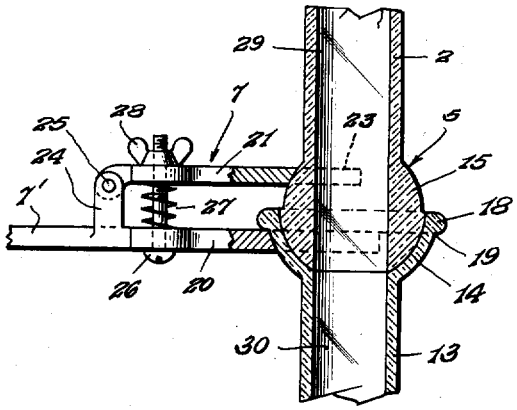
Fig. 2 is a sectional view on an enlarged scale, taken longitudinally through inter-connected portions of companion elements of the apparatus.
Figure 3:
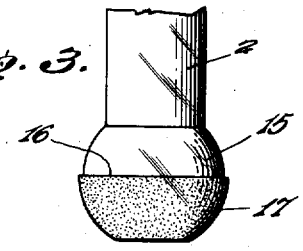
Fig. 3 is a view in side elevation, showing the male member of one element of the apparatus.
Figure 4:
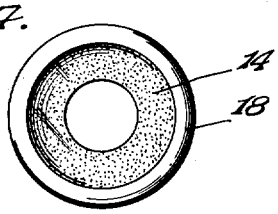
Fig. 4 is a top plan view of the female member or socket in which the male member fits.

Referring to Fig. 2, it will be seen that since one element of the chemical apparatus carries a ball which is received in a cup-shaped socket of a companion element, the elements may be disposed in axial alignment with each other or angularly adjusted and then firmly secured in the adjusted position. Therefore, if it is found that angular adjustment of a condenser or other element of a chemical apparatus in use will produce better results, the necessary adjustment of parts may be readily made. After an experiment or test has been finished, the clamps may be loosened and the elements of the apparatus easily separated from each other.

The bore 29 of the upper element is of an even diameter throughout its length instead of being tapered downwardly, as is the case when such an element is formed with a wedge shaped plug instead of a spherical ball or male member, and the bore 30 of the lower element is also of an even diameter throughout its length instead of having an enlarged portion immediately below the socket 14. Of course, if the element is in the form of a column, it will have a single bore and be provided with a socket at its upper end and a ball at its lower end. By providing a construction allowing a bore of even diameter throughout its length, the effective diameter of the bore will not be reduced by a constricted portion and an enlargement will also be eliminated, such an enlargement having been found undesirable as it creates an air pocket. By providing the clamp of the connection 5 with the arm 7' terminating in the clamp 8, the use of a separate clamp or bracket for supporting the apparatus from the rod or standard 12 at a desired height above the base 13 is not necessary.

Having thus described the invention, what is claimed is:

1. In a chemical apparatus, companion elements formed of glass and having portions in interfitting engagement with each other, one of said portions being a cup-shaped female member and the other a substantially spherical male member freely engageable in the female member, an outstanding flange surrounding said female member and having an under face, the inner surface of said female member being ground and the lower portion of the male member being of increased diameter and having a ground surface, and a clamp having jaws for straddling said members with one jaw engaging the under face of said flange and the other jaw engaging about the male member, and means for tightening said clamp and drawing said members into close contacting engagement with each other to form a tight joint and detachably hold said elements in cooperating relation to each other.

2. In a chemical apparatus, companion tubular elements formed of glass and having enlarged terminal portions in interfitting engagement with each other, one of said portions being a cup-shaped female member with a parti-spherical outer surface and the other a substantially spherical male member freely engageable in the female member, the inner surface of said female member and the confronting surface of the male member being ground and contacting with one another to form a seal, said elements having a bore of uniform diameter extending entirely through the male and female members when the elements are in substantially axial alignment, and a clamp grasping the enlarged portions of the male and female members and detachably connecting said elements together.

WILLIAM F. SCHILLING.